United States Patent [19]
Kumagai

[11] Patent Number: 6,075,983
[45] Date of Patent: Jun. 13, 2000

[54] PORTABLE COMMUNICATION DEVICE

[75] Inventor: Keiichirou Kumagai, Tokyo, Japan

[73] Assignee: NEC Corporation, Japan

[21] Appl. No.: 08/903,648

[22] Filed: Jul. 31, 1997

[30] Foreign Application Priority Data

Aug. 1, 1996 [JP] Japan ................................. 8-203625

[51] Int. Cl.⁷ .................................................... H04Q 7/32
[52] U.S. Cl. .......................... 455/410; 455/551; 455/411; 455/412; 455/558; 455/552; 455/563; 455/403
[58] Field of Search .................................... 455/410, 550, 455/551, 412, 558, 563, 566, 418, 419, 552, 556, 557, 403, 411

[56] References Cited

U.S. PATENT DOCUMENTS

| 4,998,291 | 3/1991 | Mauri et al. | 455/410 |
|---|---|---|---|
| 5,335,278 | 8/1994 | Matchett et al. | 455/410 |
| 5,414,753 | 5/1995 | Ehara | 455/551 |
| 5,428,666 | 6/1995 | Fefy et al. | 455/551 |
| 5,437,053 | 7/1995 | Sawa et al. | 455/551 |

FOREIGN PATENT DOCUMENTS 6-21884  1/1994  Japan .

*Primary Examiner*—Lee Nguyen
*Assistant Examiner*—Keith Ferguson
*Attorney, Agent, or Firm*—Ostrolenk, Faber, Gerb & Soffen, LLP

[57] ABSTRACT

There is disclosed a portable communication device comprising a storage section for managing a plurality of personal numbers and information regarding a plurality of individuals on a personal basis, whereby a plurality of users can use the device in a mode set according to each of the users. The portable communication device (portable telephone set) comprises an antenna section 1, a radio section 2, a voice processing section 3, a microphone section 4, a speaker section 5, a central control unit 6, an operation section 7, a display section 8 and a data processing section 9. The central control unit 6 controls the radio section 2, the voice processing section 3, the operation section 7, the display section 8 and the data processing section 9. The central control unit 6 includes a user retrieving section 11. By inputting a password from the operation section 7, a switch is made to a personal mode. Accordingly, a personal number (PSID) for each user can be transmitted/received and data can be managed on a personal basis.

12 Claims, 8 Drawing Sheets

FIG.2

| PERSONAL DATA 1 | PSID 1 |
| | DATA OF TELEPHONE NUMBER, INITIAL SETTING etc. |
| PERSONAL DATA 2 | PSID 2 |
| | DATA OF TELEPHONE NUMBER, INITIAL SETTING etc. |
| PERSONAL DATA 3 | PSID 3 |
| | DATA OF TELEPHONE NUMBER, INITIAL SETTING etc. |

PORTABLE COMMUNICATION DEVICE

BACKGROUND OF THE INVENTION

The present invention relates to a portable communication device, and more particularly to a portable communication device that is capable of managing personal information regarding a plurality of individuals.

Referring to FIG. 8, there is shown a conventional portable communication device, typically a portable telephone set, which comprises an antenna section 21 for transmitting/receiving a radio wave, a radio section 22 for transmitting/receiving a radio signal, a voice processing section 23 for processing a voice signal, a microphone section 24 for inputting a voice, a speaker section 25 for outputting a voice, a central control unit 26 for controlling the entire portable communication device, an operation section 27 having a button, a switch, and so on, arranged so as to input an operation signal from a user, a display section 28 for performing displaying and a memory section 29 for storing data.

The operation of the conventional portable communication device constructed in the above-noted manner will now be described. When indenting to input data regarding a telephone number, an address book or the like or initial setting regarding a function at the time of starting to the memory section 29, a user inputs data to be stored to the memory section 29 from the operation section 27. The data input from the operation section 27 is displayed on the display section 28. After having confirmed the display, the user presses the button for storing the data in the memory section 29 from the operation section 27 and then the central control unit 26 causes the memory section 29 to store the input data. When data is to be added to the memory section 29, data addition can be continued by repeating the above-noted operation until there are no more vacant areas in the memory section 29.

When the data stored in the memory section 29 is to be read or changed, the data to be read is specified, the central control unit 26 reads the data from the memory section 29, the read data is displayed on the display section 28 and then this data is changed by the operation section 27 while confirming the display on the display section 28. The user can confirm and change the data stored at the time of initial setting by performing the same operation. The data stored in the memory section 29 is backed up so as to be prevented from being erased even when power is turned OFF. By turning ON power again for the portable communication device, a mode is changed to the initial setting of the last input data.

Referring to JP-A-21884/1994, there is disclosed a radio communication device comprising a master machine connected to a cable channel and a slave machine communicated with the master machine by radio. In this case, when the slave machine is used by a plurality of individuals, memory information including a telephone number, initial setting, and so on, input for each user, is divided into blocks and stored and managed en block in the storage memory of the master machine, and by transferring this information from the master machine to the slave machine so as to change the content of the memory information of the slave machine, memory information including a telephone number, initial setting, and so on, can be set for the slave machine.

However, there were problems inherent in such a conventional portable communication device. One problem is that when one device is used by a plurality of individuals, since there is no storage section provided for managing information for each user and only one personal number to be transmitted to a base station is allocated to one device, the base station cannot identify the user when the device is used by the plurality of individuals. Consequently, a telephone directory or a call tariff cannot be managed on a personal basis.

Another problem is that since memory information including a telephone number, initial setting, and so on, for each user is set only in the master machine, such information cannot be stored or managed by the slave machine. Consequently, the memory information including a telephone number, initial setting, and so on, for each user must be transferred from the master machine to the slave machine, and this operation is troublesome.

SUMMARY OF THE INVENTION

A purpose of the present invention is to provide a portable communication device, which can manage information for a plurality of individuals on a personal basis, select a personal number for each user from a storage section for storing the information for the plurality of individuals and transmit/receive the personal number.

Another purpose of the present invention is to provide a portable communication device, which easily identify a user.

The purpose of the present invention is achieved by a portable communication device, which comprises storing means for storing data regarding a plurality of users and identification information regarding said plurality of users, being corresponding to each other for each user, and managing means for managing data for each user based on the identification information.

The purpose of the present invention is also achieved by a portable communication device comprising a storage section for storing data regarding a plurality of individuals, wherein data for each user can be managed on a personal basis.

Furthermore, if a telephone number for each user (referred to as PSID, hereinafter) is stored in the storage section, a PSID for each user can be selected from the storage section and transmitted/received. Accordingly, a telephone number, a call tariff, and so on, can be managed for each user. Also, the same effect as that when one individual has a plurality of portable communication devices is provided and thus one device can be separately used for private and business purposes. The plurality of users can call or receive calls by one communication device.

For identification information, the fingerprint, the voiceprint, and so on, of a user, can be used in addition to a password.

BRIEF DESCRIPTION OF THE DRAWINGS

This and other objects, features and advantages of the present invention will become more apparent upon a reading of the following detailed description and drawings, in which:

FIG. 2 is a view illustrating a personal data storage section 10;

DESCRIPTION OF THE PREFERRED EMBODIMENTS

The preferred embodiments of the present invention will be described below with reference to the accompanying drawings. In the embodiments, a portable telephone set which is typical of a portable communication device will be taken as an example.

Figure 1:
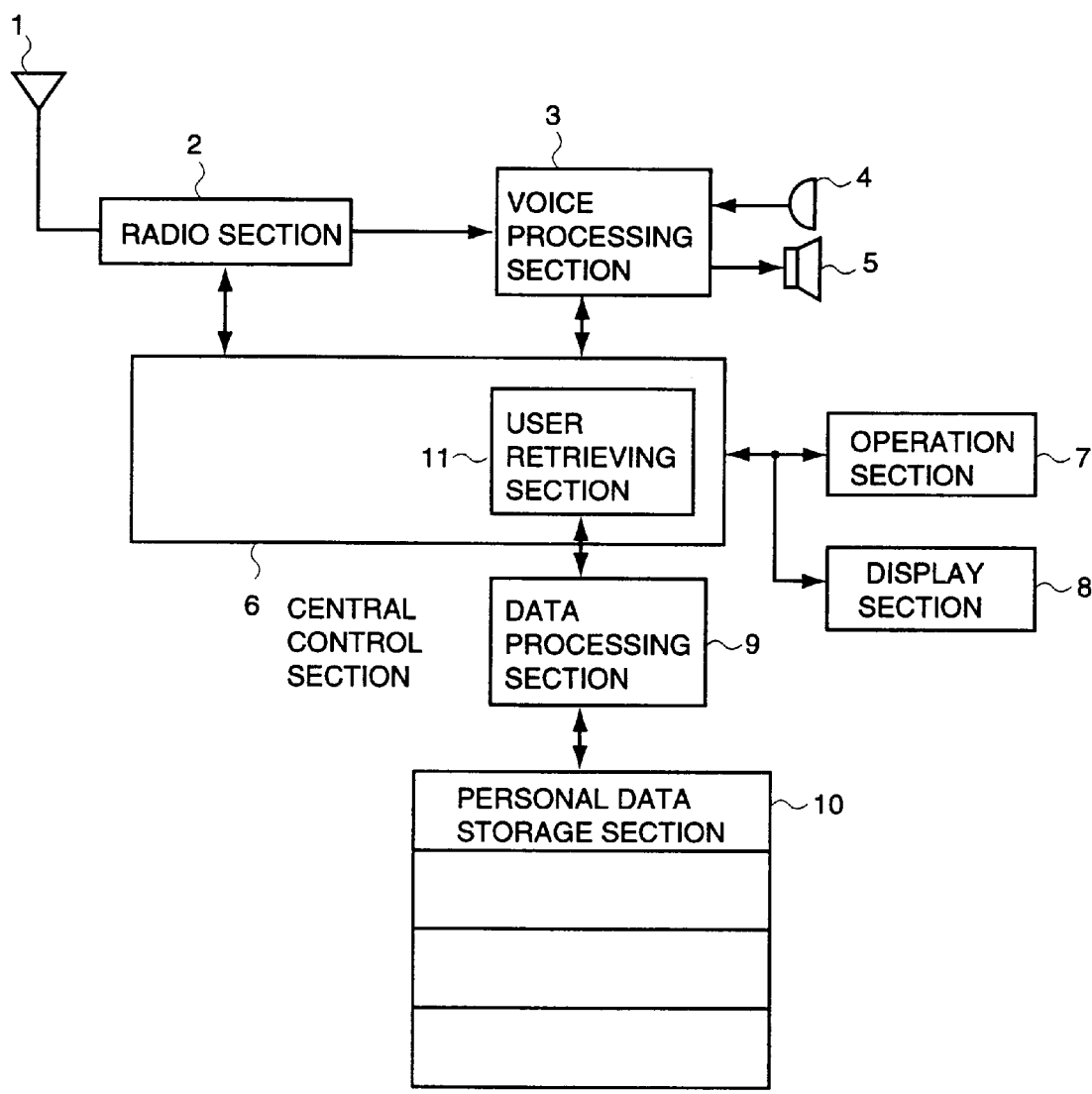
FIG. 1 is a block diagram showing a constitution of a portable telephone set of an embodiment of the present invention.

First, the circuitry of the portable telephone set of the present invention will be described by referring to FIG. 1.

A signal transmitted from a base station is received by an antenna section 1, passed through a radio section 2 and a voice processing section 3 and then outputted as a voice signal from a speaker section 5.

A voice collected by a microphone section 4 is passed through the voice processing section 3, the radio section 2 and the antenna section 1, transmitted to the base station and then communication is carried out. A central control unit 6 controls the radio section 2, the voice processing section 3, an operation section 7, a display section 8 and a data processing section 9. The central control unit 6 includes a user retrieving section 11.

Next, the operation of the portable communication device (portable telephone set) of the present invention will be described.

First, registration of a user is performed by using a password. This password may be numerals such as 01234 or characters such as ABCD. The password corresponds to data regarding a user stored in a personal data storage section 10. The data regarding each user is divided into blocks and stored in the personal data storage section 10. Accordingly, by setting a password for each user, the data regarding each user can be managed on a personal basis. The data regarding each user means data regarding a telephone number, an address book or the like or initial setting regarding a function at the time of starting.

A personal number (PSID) for each user is also divided into blocks and registered beforehand in the personal data storage section 10. By setting a password corresponding to each PSID, use by a plurality of individuals and management on a personal basis can be allowed. The PSID means a telephone number that the portable telephone set has. For example, characters may be placed after a normal telephone number, such as 101 (12) 3455 * 1 and 101 (12) 3455 * 2, and alternatively a plurality of telephone numbers completely difference from one another may be given to one telephone set.

Referring to FIG. 2, there is shown an example of storing in the personal data storage section 10. Data shown is based on the case that three individuals use one portable telephone set. Each personal data is stored in each storage area obtained by division into blocks.

Next, the operation of inputting data to the personal data storage section 10 performed by a user will be described.

A password is input from the operation section 7. The user retrieving section 11 collates this password. If coincidence for the password is discovered, then a mode is switched to setting for each user (personal mode). Then, data to be stored in the personal data storage section 10 is input from the operation section 7. The data input from the operation section 7 is then displayed on the display section 8. After having confirmed the display, the user presses a button for storing the data in the personal data storage section 10 from the operation section 7, and thereby the central control unit 6 stores the data in the personal data storage section 10 via the data processing section 9.

When data is to be added to the personal data storage section 10, data addition can be continued by repeating the above-noted operation until no more vacant areas exist in the personal data storage section 10.

When the data stored in the personal data storage section 10 is to be read or changed, similarly to the above-noted operation, a password is first input from the operation section 7 and the operation is switched to the personal mode. Then, the data to be read is specified by the operation section 7, and thereby the central control unit 6 reads the personal data storage section 10 via the data processing section 9 and then displays the data on the display section 8. The data is changed by the operation section 7 while confirming the display on the display section 8. The user can also confirm and change the stored data regarding initial setting or the like by performing a similar operation. The data stored in the personal data storage section 10 is backed up so as to be prevented from being erased even when power is turned OFF. A condition is returned to initial setting for the last input data by turning ON power again for the portable communication device.

Figure 3:
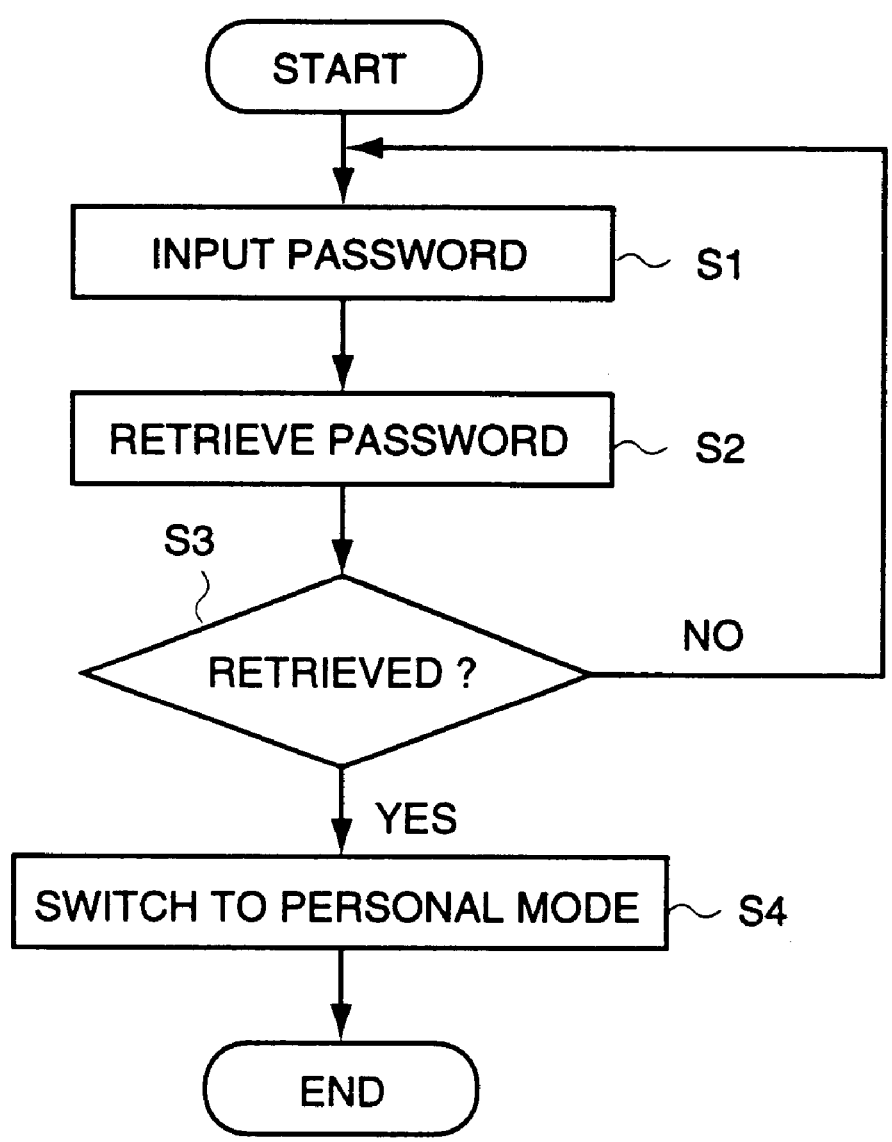
FIG. 3 is a flowchart showing an operation of the portable telephone set of the present invention.

Referring to FIG. 3, there is shown a flowchart illustrating an operation procedure for making a switch to the personal mode. First, in step S1, a password is input from the operation section, In step S2, retrieving is performed for the input password. In step S3, determination is made as to whether the password has been retrieved or not. If the retrieval of the password is determined in step S3, the process proceeds to step S4, where a switch is made to the personal mode for each user and then the portable communication device can be used by using the data stored for each user.

Figure 4:
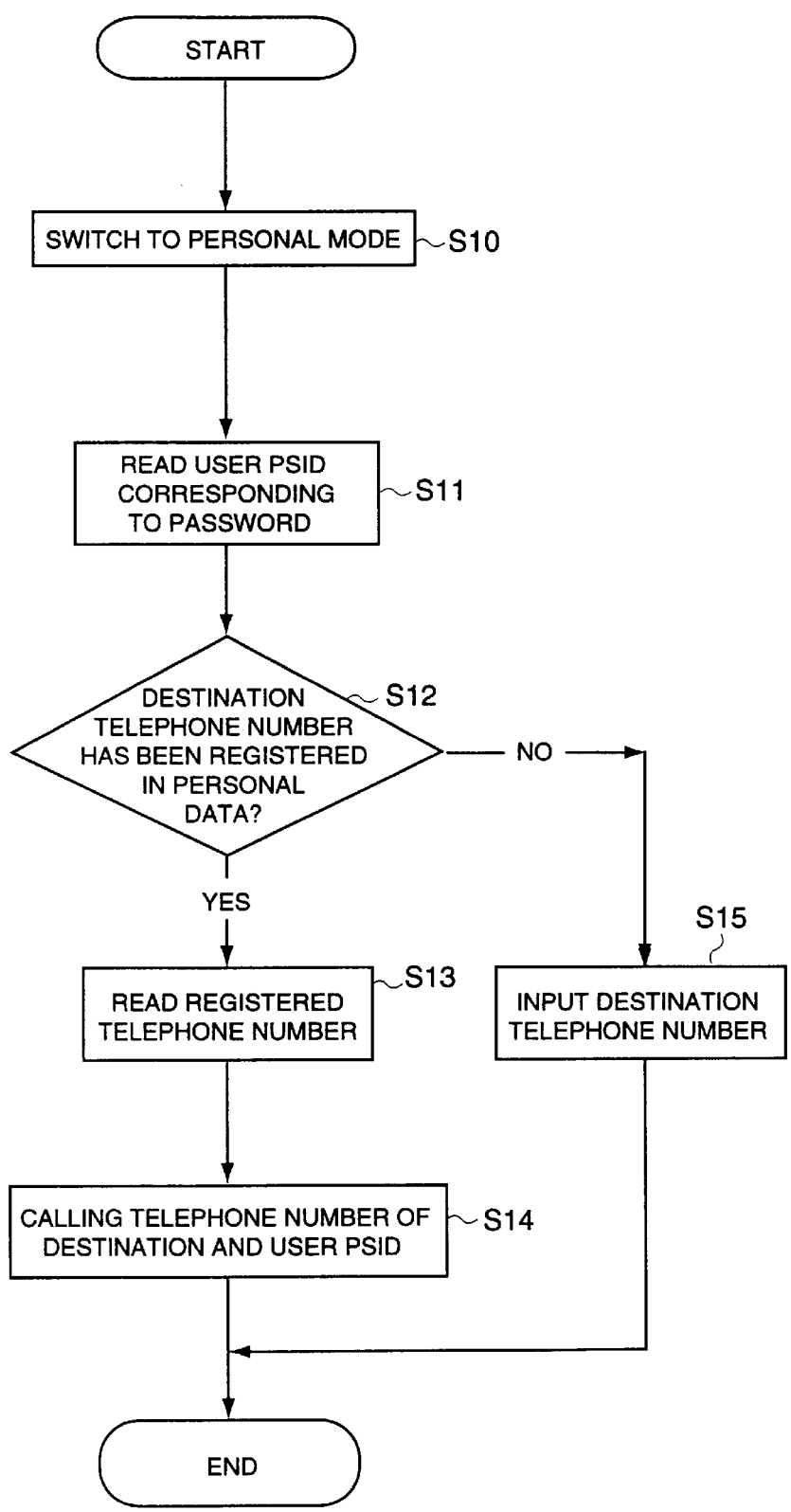
FIG. 4 is a flowchart showing another operation of the portable telephone set of the present invention.

Next, making calling by the portable communication device of the present invention will be described by referring to the flowchart shown in FIG. 4.

For making calling, in step S10, first a switch must be made to the personal mode. The operation of making a switch to the personal mode was made above by referring to FIG. 3 and thus its description will be omitted.

After the personal mode has been set, in step S11, the PSID for each user is read from the personal data storage section 10 via the data processing section 9.

If calling is to be made to the telephone number whose data has been registered in step S12, the telephone number to be addressed to is read from the personal data storage section 10 by pressing the button of the operation section 7 in step S13. By confirming the telephone number displayed on the display section 8, the calling button of the operation section 7 is pressed and then calling is made in step S14. Then, the PSID of the user and the telephone number to be addressed to are transmitted from the antenna section 1 through the radio section 2.

In this case, the PSID to be transmitted must be registered beforehand in the base station. Since the transmitted PSID can also be read from the base station in this way, a call tariff can be managed for each user.

For calling made to an address whose data has not been registered in step S12, its telephone number is input and then transmitted in step S15. In this case, the PSID to be transmitted is also registered beforehand in the base station. Since the transmitted PSID can also be read from the base station, a call tariff can be managed for each user.

Figure 5:
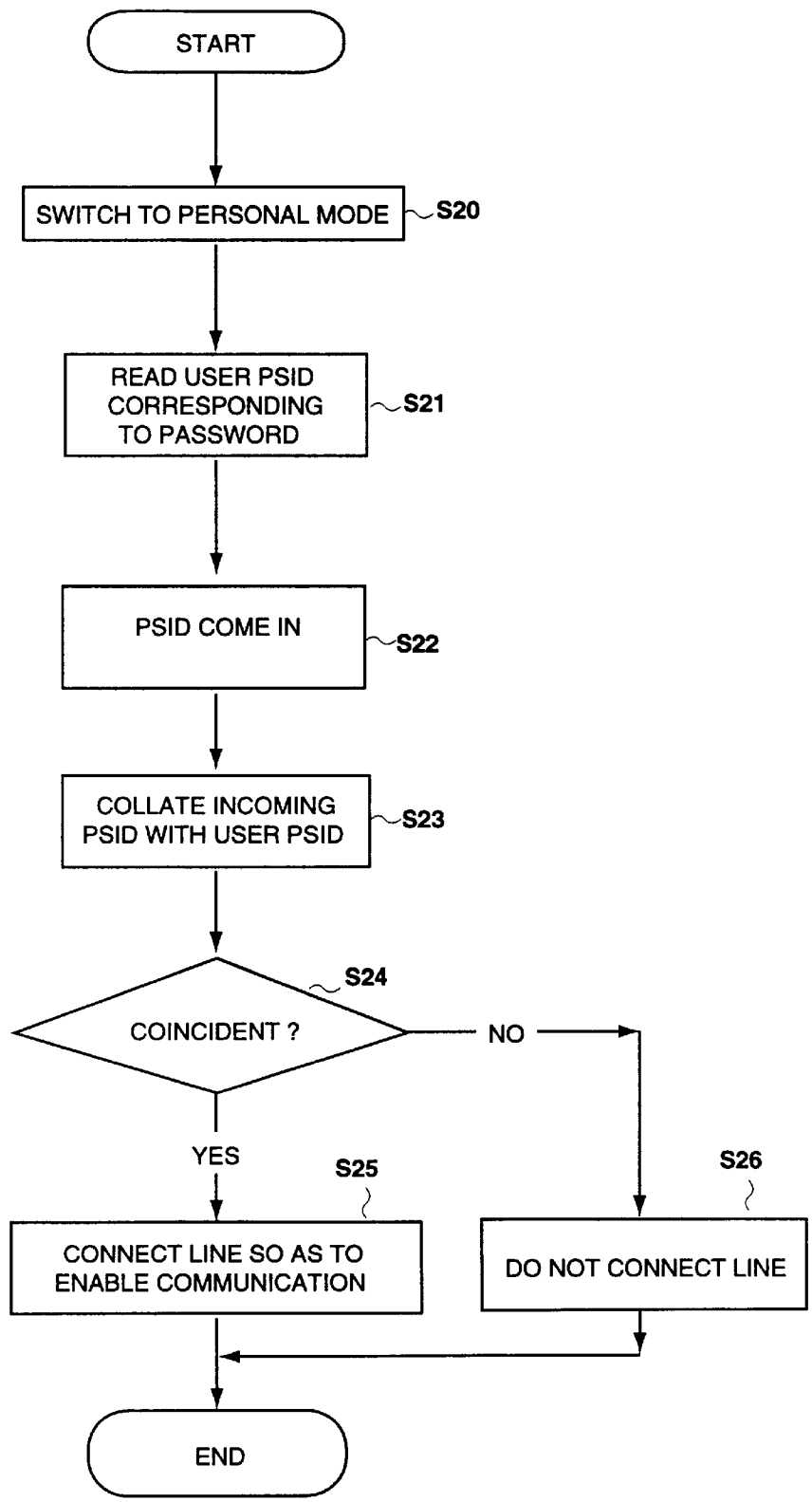
FIG. 5 is a flowchart showing yet another operation of the portable telephone set of the present invention.

Next, the case of an incoming call will be described by referring to a flowchart shown in FIG. 5. For an incoming call, the operation is also performed based on the personal mode in step 20. Thus, description of the operation until making a switch to the personal mode will be omitted.

First, user PSID corresponding to password is read in step S21.

A PSID transmitted from the base station is received by the antenna section 1, passed through the radio section 2 in step S22 and confirmation is made as to whether this PSID coincides with a currently used PSID for each user or not in the user retrieving section 12 in step S23. If coincidence is discovered in step S24, communication is allowed in step S25. If no coincidence is discovered between the PSID transmitted from the base station and the currently used PSID for each user, communication is not allowed in step S26. Accordingly, even when one portable communication device is used by a plurality of individuals, no calls other than that from the user currently using the device come in.

Another embodiment of the present invention will be described.

As means for identifying a user, in addition to a password, a fingerprint or a voiceprint can be used. In such a case, instead of the operation section 7 for inputting a password, a circuit for registering a fingerprint or a voiceprint and performing retrieval during use may be provided. Accordingly, troublesome work of inputting a password can be eliminated.

Figure 6:
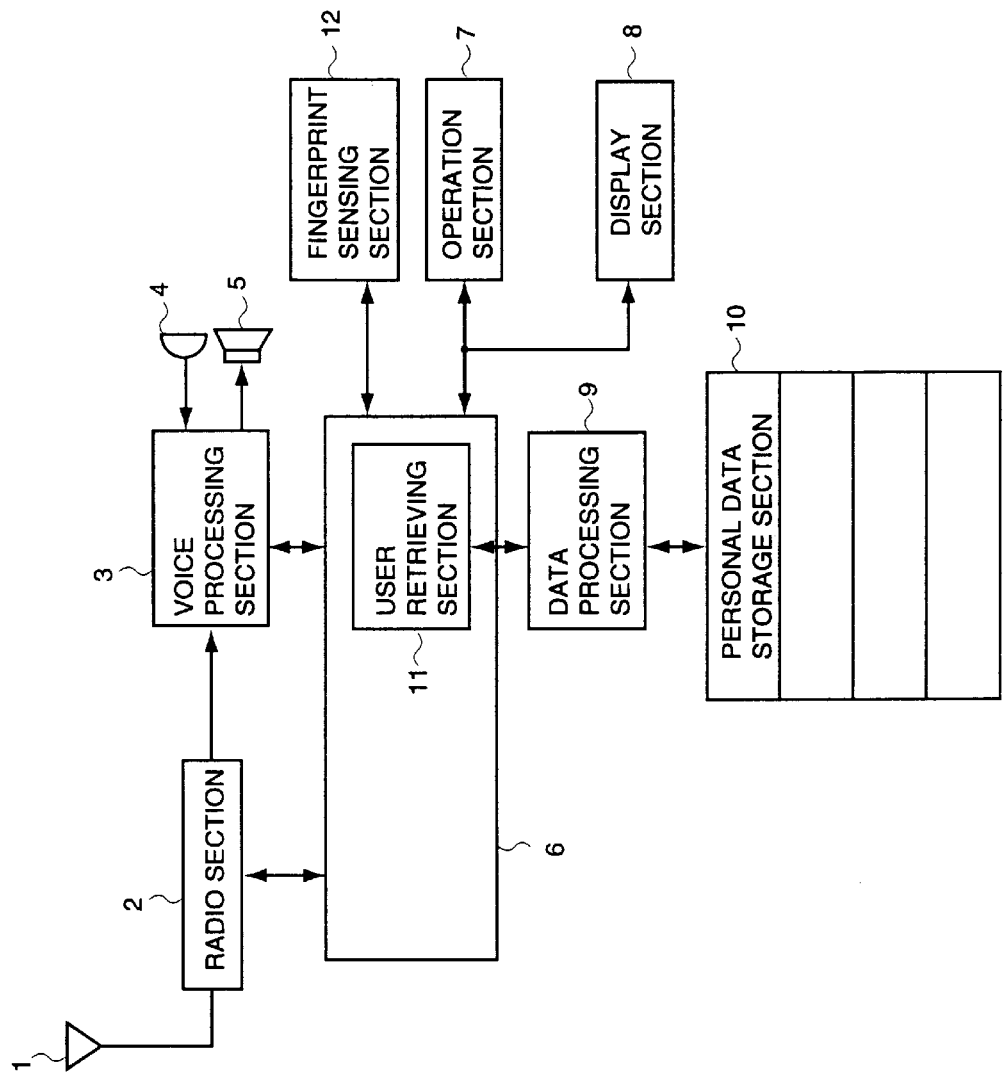
FIG. 6 is a block diagram showing a constitution of a portable telephone set of another embodiment of the present invention.

Referring to FIG. 6, there is shown in block a portable telephone set, which includes a fingerprint sensing section 12.

The fingerprint sensing section 12 shown can read the fingerprint of a user. The user inputs his/her own fingerprint information instead of a password by the fingerprint sensing section 12 and stores this information in the personal data storage section 10 beforehand. In this way, instead of collating of the password, by performing collation for the fingerprint, personal data can be managed.

Figure 7:
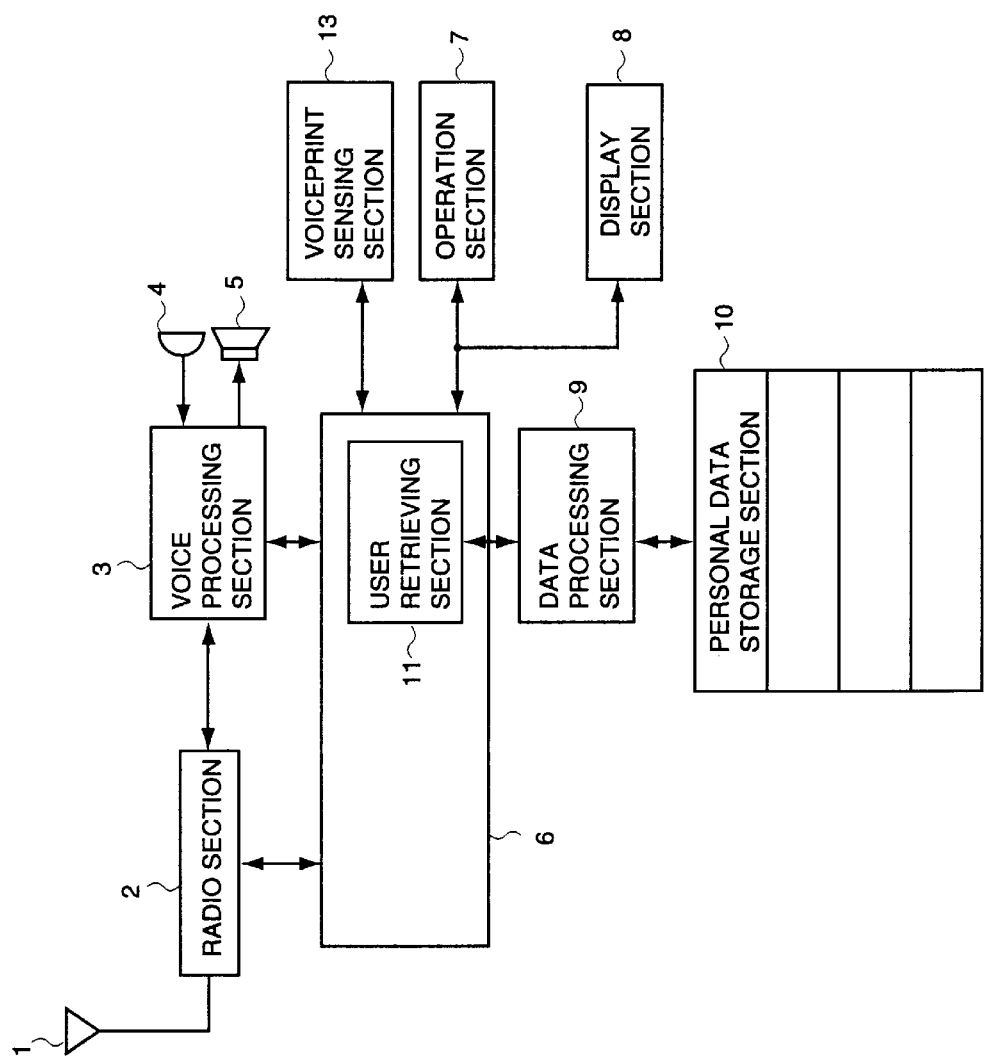
FIG. 7 is a block diagram showing a constitution of a telephone set of yet another embodiment of the present invention.
Figure 8:
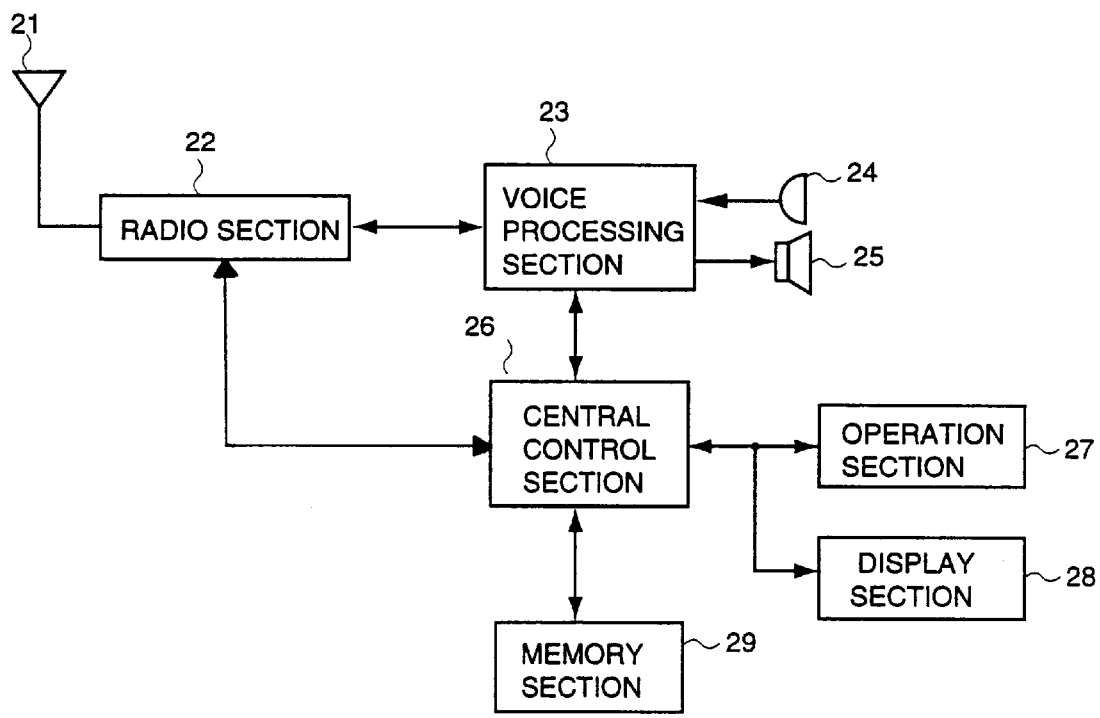
FIG. 8 is a block diagram showing a constitution of a conventional portable communication device.

Referring to FIG. 7, there is shown in block a portable telephone set, which includes a voiceprint sensing section 13.

The voiceprint sensing section 13 shown can read the voiceprint of a user. The user inputs his/her own voiceprint information instead of a password by the voiceprint sensing section 13 and stores this information in the personal data storage section 10 beforehand. In this way, instead of collating of the password, by performing collation for the voiceprint, personal data can be managed.

The above-described portable communication device can be used by a plurality of individuals. In addition, the device is used by one individual separately for both business and private purposes.

As described above, the portable communication device of the present invention includes the storage section for individually storing data regarding a plurality of individuals, data regarding each user can be managed by using a password on a personal basis and a PSID for each user can be selected from the storage section, transmitted and received. Accordingly, a telephone number, a call tariff, and so on, can be managed for each user. In other words, even when one portable communication device is used by a plurality of individuals, the user can use the device feeling that the device is his/her own.

Furthermore, if one portable communication device is used by one individual, an effect similar to that obtained when a plurality of devices are owned by one individual can be provided and one device can be used separately for private and business purposes.

The entire disclosure of Japanese patent Application No. 8-203625 filed on Aug. 1, 1996, including specification, claims, drawings and summary are incorporated herein by reference in its entirety.

What is claimed is:

1. A portable communication device comprising:

storing means for storing data regarding a plurality of users and fingerprint information regarding said plurality of users in a corresponding manner for each user; and managing means for managing data for each user based on said fingerprint information, said managing means comprises collating means for collating said fingerprint information for each user with a specified fingerprint and means for managing corresponding data for said user based on a result of collation between said fingerprint information and said specified fingerprint information performed by said collating means.

2. A portable communication device comprising:

storing means for storing personal data regarding a plurality of users and passwords for said plurality of users in a corresponding manner for each user;

password inputting means for inputting a password for each user;

collating means for collating a password input by said password inputting means with identification information stored in said storing means;

means for reading and displaying personal data for a user corresponding to said input password after coincidence is discovered between said password and said identification information by said collating means; and means for renewing personal data for each user corresponding to said input password after coincidence is discovered between said password and said identification information by said collating means.

3. The portable communication device of claim 2, wherein said storing means comprises means for storing fingerprint information for each user instead of a password, fingerprint information inputting means for inputting information regarding a fingerprint is provided instead of said password inputting means and said collating means includes means for collating fingerprint information input by said fingerprint inputting means with said fingerprint information for each user.

4. The portable communication device of claim 2, wherein said storing means stores voiceprint information for each user instead of a password, voiceprint information inputting means is for inputting information regarding a voiceprint is provided instead of said password inputting means and said collating means includes means for collating voiceprint information input by said voiceprint information inputting means with said voiceprint information for each user.

5. A portable communication device comprising:

storing means for storing telephone numbers for a plurality of users and identification information regarding said plurality of users in a corresponding manner for each user;

identification information inputting means for inputting identification information for each user;

collating means for collating identification information input by said identification information inputting means with identification information stored in said storing means;

reading means for reading a telephone number for each user corresponding to said identification information collated by said collating means from said storing means; and transmitting means for transmitting said read telephone number as a telephone number of a caller side.

6. The portable communication device of claim 5, wherein said storing means comprises means for storing a password as said identification information for each user, a password is input by said identification information inputting means and collation is performed for said input password by said collating means.

7. The portable communication device of claim 5, wherein said storing means comprises means for storing fingerprint information for each user as said identification information for each user, fingerprint information is input by said identification information inputting means and collation is performed for said input fingerprint information by said collating means.

8. The portable communication device of claim 5, wherein said storing means comprises means for storing voiceprint information for each user as said identification information for each user, voiceprint information is input by said identification information inputting means and collation is performed for said input voiceprint information by said collating means.

9. A portable communication device comprising:

storing means for storing telephone numbers for a plurality of users and identification information regarding said plurality of users in a corresponding manner for each user;

identification information inputting means for inputting identification information for each user;

first collating means for collating identification information input by said identification information inputting means with identification information stored in said storing means;

reading means for reading a telephone number of a user corresponding to said identification information collated by said collating means from said storing means;

second collating means for collating said read telephone number with a telephone number of an incoming call; and connecting means for connecting said incoming call so as to enable communication when coincidence is discovered between said telephone numbers by said second collating means.

10. The portable communication device of claim 9, wherein said storing means comprises means for storing a password as said identification information for each user, a password is input by said identification information inputting means and collation is performed for said input password by said collating means.

11. The portable communication device of claim 9, wherein said storing means comprises means for storing fingerprint information for each user as said identification information for each user, fingerprint information is input by said identification information inputting means and collation is performed for said input fingerprint information by said collating means.

12. The portable communication device of claim 9, wherein said storing means comprises means for storing voiceprint information for each user as said identification information for each user, voiceprint information is input by said identification information inputting means and collation is performed for said input voiceprint information by said collating means.

* * * * *